United States Patent
Hada

(10) Patent No.: US 9,884,383 B2
(45) Date of Patent: Feb. 6, 2018

(54) WIRE-CUT ELECTRICAL DISCHARGE MACHINING MACHINE IN WHICH POSITION OF LIQUID LEVEL OF MACHINING FLUID IS ADJUSTED AT TIME OF AUTOMATIC WIRE THREADING

(71) Applicant: FANUC Corporation, Yamanashi (JP)

(72) Inventor: Keita Hada, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 50 days.

(21) Appl. No.: 14/731,909

(22) Filed: Jun. 5, 2015

(65) Prior Publication Data
US 2015/0352648 A1 Dec. 10, 2015

(30) Foreign Application Priority Data

Jun. 6, 2014 (JP) .................... 2014-118191

(51) Int. Cl.
*B23H 7/20* (2006.01)
*B23H 7/10* (2006.01)
(Continued)

(52) U.S. Cl.
CPC .............. *B23H 7/102* (2013.01); *B23H 7/06* (2013.01); *B23H 7/20* (2013.01); *B23H 7/36* (2013.01); *B23H 1/10* (2013.01); *B23H 7/101* (2013.01)

(58) Field of Classification Search
CPC ................ G05B 2219/45043; B23H 7/02; B23H 7/101; B23H 7/102; B23H 1/10
(Continued)

(56) References Cited

U.S. PATENT DOCUMENTS 4,755,651 A 7/1988 Tsutsui et al.
5,170,026 A 12/1992 Suga et al.
(Continued)

FOREIGN PATENT DOCUMENTS

CN 102019471 A 4/2011
CN 201824035 U 5/2011
(Continued)

OTHER PUBLICATIONS

Office Action dated Oct. 20, 2015, corresponding to Japanese Patent Application No. 2014-118191.
(Continued)

*Primary Examiner* — Thien S Tran
(74) *Attorney, Agent, or Firm* — Hauptman Ham, LLP

(57) ABSTRACT

A wire-cut EDM machine in which the position of the liquid level of machining fluid is adjusted at the time of automatic wire threading includes a shape information acquisition unit for acquiring information on the shape of an object to be machined, a wire-threading position information acquisition unit for acquiring information on a wire-threading position of a wire electrode based on relative positions of upper and lower wire guides, and a liquid level position adjustment unit for acquiring the height of the object to be machined in the vicinity of the wire-threading position based on the information on the shape of the object to be machined and adjusting the position of the liquid level of the machining fluid at the time of automatic wire threading.

4 Claims, 4 Drawing Sheets

(51) Int. Cl.
*B23H 7/06* (2006.01)
*B23H 7/36* (2006.01)
*B23H 1/10* (2006.01)

(58) Field of Classification Search
USPC .......................................... 219/69.12, 69.13
See application file for complete search history.

(56) References Cited

U.S. PATENT DOCUMENTS

| | | | | |
|---|---|---|---|---|
| 7,947,917 | B2* | 5/2011 | Kita | ........................ B23H 1/10 210/143 |
| 2003/0015417 | A1 | 1/2003 | Fulton et al. | |
| 2004/0251238 | A1* | 12/2004 | Ogata | ...................... B23H 7/20 700/162 |
| 2013/0037522 | A1 | 2/2013 | Hosaka | |
| 2013/0248494 | A1 | 9/2013 | Inaba et al. | |
| 2014/0291294 | A1 | 10/2014 | Inaba | |

FOREIGN PATENT DOCUMENTS

| | | |
|---|---|---|
| CN | 103317199 A | 9/2013 |
| EP | 0468451 A2 | 1/1992 |
| EP | 2783781 A2 | 10/2014 |
| JP | 1-205931 A | 8/1989 |
| JP | 6-320339 A | 11/1994 |
| JP | H07-040148 A | 2/1995 |
| JP | 2006-231418 A | 9/2006 |
| JP | 2008-100337 A | 5/2008 |
| JP | 2011-136409 A | 7/2011 |
| JP | 2011-230216 A | 11/2011 |
| WO | 2013/054422 A1 | 4/2013 |

OTHER PUBLICATIONS

Extended European Search Report dated Oct. 12, 2015, corresponding to European Patent Application No. 15169405.6.
Office Action in CN Application No. 201510306012.1, dated Apr. 19, 2017.

* cited by examiner

WIRE-CUT ELECTRICAL DISCHARGE MACHINING MACHINE IN WHICH POSITION OF LIQUID LEVEL OF MACHINING FLUID IS ADJUSTED AT TIME OF AUTOMATIC WIRE THREADING

RELATED APPLICATIONS

The present application claims priority to Japanese Application Number 2014-118191, filed Jun. 6, 2014, the disclosure of which is hereby incorporated by reference herein in its entirety.

BACKGROUND OF THE INVENTION

1. Field of the Invention

The present invention relates to a wire-cut electrical discharge machining (EDM) machine, and particularly to a wire-cut EDM machine in which the position of the liquid level of machining fluid is adjusted at the time of automatic wire threading.

2. Description of the Related Art

In wire electrical discharge machining, when a wire electrode is broken during the machining of a workpiece, returning to a machining start point and wire threading may be required. Accordingly, there is a problem that it takes a long time to perform wire threading. Meanwhile, there is a technique in which wire threading is performed at the position of occurrence of a break without returning to a machining start point in order to reduce the time required to perform a wire-threading operation. However, in the case of a workpiece having a shape with varying plate thickness, the distance from an upper nozzle to an upper surface of the workpiece varies in accordance with the position of occurrence of a break, and therefore wire-threading conditions also vary. Accordingly, depending on the position of occurrence of a break, the wire electrode is not fed straight at the time of automatic wire threading and cannot be easily passed through a machined groove. Thus, there is a problem that a reduction of wire-threading time cannot be achieved. To solve these problems, the success rate of automatic wire threading at the position of occurrence of a break needs to be improved.

One prior art technique is a wire-cut EDM machine described in Japanese Patent Application Laid-Open No. 07-040148. This is a wire-cut EDM machine of a type in which a wire electrode runs in a horizontal direction. In this wire-cut EDM machine, the success rate of wire threading is improved by discharging machining fluid at the time of automatic wire threading so that a region in which the wire electrode passes at the time of automatic wire threading may be exposed to air.

In general, in the case where automatic wire threading is performed in a wire-cut EDM machine of a type in which a wire electrode runs in a vertical direction, if the wire electrode is exposed to air until the wire electrode is inserted into a machined groove of a workpiece, the success rate of wire threading is improved. Moreover, after the wire electrode is inserted into the machined groove of the workpiece, the success rate of wire threading is improved if the wire electrode is submerged in the machining fluid.

The prior art technique described in the section of Description of the Related Art is a technique for a wire-cut EDM machine of a type in which a wire electrode runs in a horizontal direction. If the technique is used in a wire-cut EDM machine of a type in which a wire electrode runs in a vertical direction, machining fluid is to be discharged until a lower wire guide is exposed to air. Accordingly, the workpiece is exposed to air even after the wire electrode is inserted into a machined groove of a workpiece, and the success rate of wire threading decreases. Moreover, there is another problem that it takes a long time to discharge and inject the machining fluid.

As described above, if the height of the liquid level of the machining fluid is adjusted to a level close to the workpiece upper surface, the success rate of wire threading is high both before and after the wire electrode is inserted into the machined groove of the workpiece. However, in the case of a workpiece having a shape with varying plate thickness, the height of an upper surface of the workpiece varies in accordance with the position of wire threading. Accordingly, the height of the liquid level of machining fluid needs to be changed in accordance with the plate thickness of the workpiece.

SUMMARY OF THE INVENTION

Accordingly, an object of the present invention is to provide a wire-cut EDM machine in which machining efficiency is improved by adjusting the height of the liquid level of machining fluid in accordance with the shape of a workpiece in the vicinity of a wire-threading position of a wire electrode to improve the success rate of wire threading for a workpiece having a shape with varying plate thickness and reduce the time required for automatic wire threading.

A wire-cut EDM machine of the present invention, in which a position of a liquid level of machining fluid is adjusted at a time of automatic wire threading, includes a work tank for storing the machining fluid, machines an object to be machined with the object to be machined being mounted on a table provided in the work tank by moving a wire electrode stretched between upper and lower wire guides and the table relative to each other, and has an automatic wire threading function for automatically threading the wire electrode stretched between the upper and lower wire guides. The wire-cut EDM machine includes a shape information acquisition unit for acquiring information on a shape of the object to be machined; a wire-threading position information acquisition unit for acquiring information on a wire-threading position of the wire electrode based on relative positions of the upper and lower wire guides; and a liquid level position adjustment unit for acquiring a height of the object to be machined in a vicinity of the wire-threading position based on the information on the shape of the object to be machined and adjusting the position of the liquid level of the machining fluid at the time of automatic wire threading.

The shape information acquisition unit may acquire the information on the shape of the object to be machined by inputting data which associates machining positions with plate thicknesses of the object to be machined.

The liquid level position adjustment unit may adjust the position of the liquid level of the machining fluid at the time of automatic wire threading based on a shape of an upper surface of the object to be machined as well as the height of the object to be machined in the vicinity of the wire-threading position.

Alternatively, the liquid level position adjustment unit may adjust the position of the liquid level of the machining fluid at the time of automatic wire threading in accordance with physical properties of the wire electrode as well as the height of the object to be machined in the vicinity of the wire-threading position.

With the above-described configuration, the present invention can provide a wire-cut EDM machine in which machining efficiency is improved by adjusting the height of the liquid level of machining fluid in accordance with the shape of the workpiece in the vicinity of a wire-threading position of a wire electrode to improve the success rate of wire threading for a workpiece having a shape with varying plate thickness and reduce the time required for automatic wire threading.

BRIEF DESCRIPTION OF THE DRAWINGS

These and other objects and features of the present invention will become apparent from the following description of exemplary embodiments with reference to the accompanying drawings in which.

DETAILED DESCRIPTION OF THE PREFERRED EMBODIMENTS

The following embodiments are included within claims 1 and 2.

Figure 1:
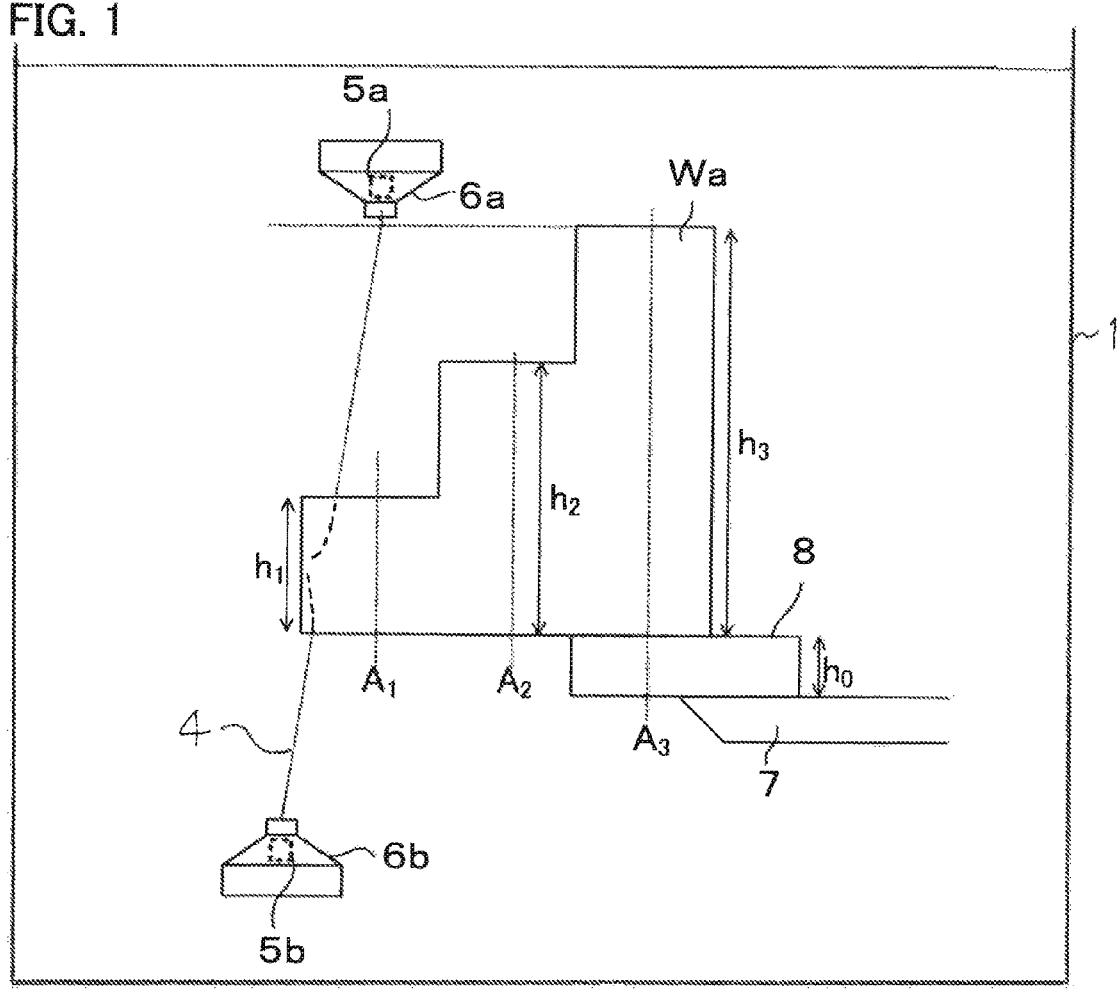
FIG. 1 is a view for explaining the machining of a workpiece having a shape with varying thickness.

A description will be made of the machining of a workpiece having a shape with varying thickness, such as shown in FIG. 1. Here, it is assumed that a workpiece Wa having a stepped shape in which plate thicknesses are $h_1$, $h_2$, and $h_3$ is raised from a table 7 of a processing machine with a fixture 8 by a height of $h_0$, and an example will be described in which the height of the liquid level of machining fluid is adjusted in accordance with the height of a workpiece upper surface at a wire-threading point. An upper nozzle 6a is assumed to be at a height separated from an uppermost surface of the workpiece Wa by a certain distance. FIG. 1 further shows a work tank 1 storing the machining fluid. The table 7 is provided in the work tank 1. During machining, a wire electrode 4 is stretched between an upper wire guide 5a and a lower wire guide 5b. FIG. 1 shows the wire electrode 4 in a state where a break has just occurred in the wire electrode 4. The upper nozzle 6a and a lower nozzle 6b are provided at the upper wire guide 5a and the lower wire guide 5b, respectively.

First, data which indicates the shape of the workpiece along a machining path, such as 3D data or data which associates machining positions with heights of the workpiece upper surface, is acquired.

In the case where a break occurs during machining, a path along which a wire electrode 4 fed from an upper wire guide 5a at the time of automatic wire threading passes until the wire electrode 4 is inserted into a lower wire guide 5b is acquired based on the coordinates of the upper and lower wire guides 5a and 5b at the time of automatic wire threading.

Using data on the workpiece shape and data on the path of passage of the wire electrode 4, which are acquired in the process described in the previous two paragraphs, the workpiece shape in the vicinity of the wire-threading point is checked. Then, the height of the workpiece upper surface at the wire-threading point is calculated from information on the workpiece shape, the height of the liquid level of the machining fluid is adjusted to a level close to the height of the workpiece upper surface, and an automatic wire-threading operation is performed.

For example, in the case where wire threading is performed at points $A_1$, $A_2$, and $A_3$ in FIG. 1, the height of the liquid level of the machining fluid is adjusted to levels close to the heights $h_0+h_1$, $h_0+h_2$, and $h_0+h_3$ of the workpiece upper surface at the wire-threading points, respectively. In the case where the height of the liquid level during machining is nearly equal to the height of the workpiece upper surface at the wire-threading point, the height of the liquid level does not need to be adjusted.

Even in a machine in which data on the shape of the workpiece Wa cannot be acquired, the height of the liquid level of the machining fluid can also be adjusted based on data on an estimated height of the workpiece upper surface at the wire-threading point, the estimated height being estimated by, for example, measuring the water pressure of the machining fluid emitted from a nozzle, feeding the wire while vibrating the wire to check the position at which the wire touches the workpiece Wa, or the like.

Next, for a machine in which data on the shape of the workpiece Wa at an arbitrary wire-threading point cannot be acquired and in which the height of the workpiece upper surface cannot be estimated by the way described in the previous paragraph, an example will be described in which the success rate of wire threading can be improved even if the workpiece shape at the wire-threading point is unknown.

The machining of the workpiece Wa having the shape shown in FIG. 1 will be described. In the case of this example, it is assumed that the plate thicknesses $h_1$ and $h_3$ of a smallest-plate-thickness portion and a largest-plate-thickness portion can be acquired.

In the case where a break occurs during machining, the height of the liquid level of the machining fluid is adjusted to a level close to, for example, a height midway between the heights of the smallest-plate-thickness portion and the largest-plate-thickness portion (see expression (1)), and an automatic wire-threading operation is performed. In that case, the liquid level of the machining fluid cannot necessarily be adjusted to a level close to the height of the workpiece upper surface at the wire-threading point. However, the success rate of wire threading can be improved compared to that in the case where no adjustment is performed.

$$h_0 + \frac{h_1 + h_3}{2} \tag{1}$$

The following embodiments are included within claim 3.

Figure 2:
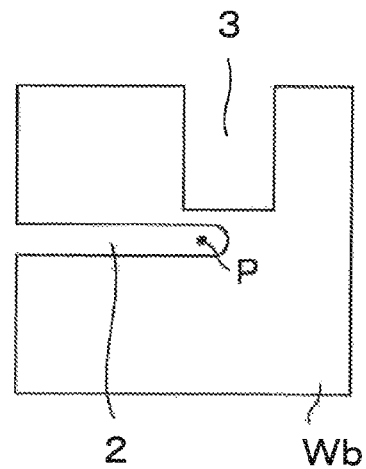
FIG. 2 is a view of a workpiece which is being machined, as seen from above.

The machining of a workpiece Wb having a shape shown in FIG. 2 will be described. FIG. 2 shows the shape of the workpiece Wb during machining as seen from the upper surface thereof. This machining is performed along the machined groove 2 shown in the drawing. In the vicinity of the machined groove 2, another hole shape (hole portion 3) is assumed to exist. Moreover, the height of the workpiece upper surface is constant. Point P is a position at which a break has been detected.

In the case where a break has occurred during machining and where automatic wire threading is performed at the position of point P in FIG. 2, the fed wire electrode 4 may be inserted into the wrong hole in the vicinity thereof, and wire threading may end unsuccessfully.

In general, when the wire electrode 4 is fed, a machining fluid jet is emitted from the upper nozzle, and the direction in which the wire electrode 4 is fed is controlled by the fluid pressure of the jet. However, in the case where a tip of the wire electrode 4 which is being fed is in the machining fluid, the fluid pressure of the emitted jet is weakened by viscous drag, and the direction in which the wire electrode 4 is fed may be out of control.

In cases such as this example, automatic wire threading is performed with the workpiece upper surface exposed to air by lowering the water level of the machining fluid. In that case, until the wire electrode 4 is inserted into an appropriate machined groove, the fluid pressure of the emitted jet is not weakened, and the control of the direction in which the wire electrode 4 is fed effectively works. Accordingly, the success rate of wire threading can be improved.

The following embodiments are included within claim 4.

As physical properties of the wire electrode 4, rigidity will be discussed. For the case where the rigidity of the wire electrode 4 is high, a method of reducing the time required for a wire-threading operation will be described in an example in which the workpiece plate thickness at the wire-threading point is small and in which the distance from the upper nozzle is long. For example, for the workpiece Wa having the shape shown in FIG. 1, wire threading performed at point $A_1$, at which the plate thickness is $h_1$, will be discussed.

First, data on the rigidity of the wire electrode 4 to be used is acquired in advance. For example, the data may be data which associates materials and wire diameters with rigidity values.

When a break occurs during machining, if the acquired rigidity of the wire electrode 4 is lower than a threshold value set in advance, the height of the liquid level of the machining fluid is adjusted to a level close to the height $h_0+h_1$ corresponding to the workpiece upper surface. Meanwhile, if the rigidity of the wire electrode 4 is higher than the threshold value, the height of the liquid level of the machining fluid is adjusted to a level close to the height $h_0+h_1+H$ obtained by adding an adjustment amount H set in advance to the height of the workpiece upper surface, and automatic wire threading is performed.

In general, in the case where the rigidity of the wire electrode 4 is high, even if the height of the liquid level of the machining fluid is higher than a level close to $h_0+h_1$, the success rate of wire threading is high. In this example, in the case where the rigidity of the wire electrode 4 is high, the time required for the adjustment of the height of the liquid level of the machining fluid can be reduced compared to that for the case where the height of the liquid level of the machining fluid is close to $h_0+h_1$, by adjusting the height of the liquid level of the machining fluid to a position higher than a level close to the workpiece upper surface.

Figure 3:
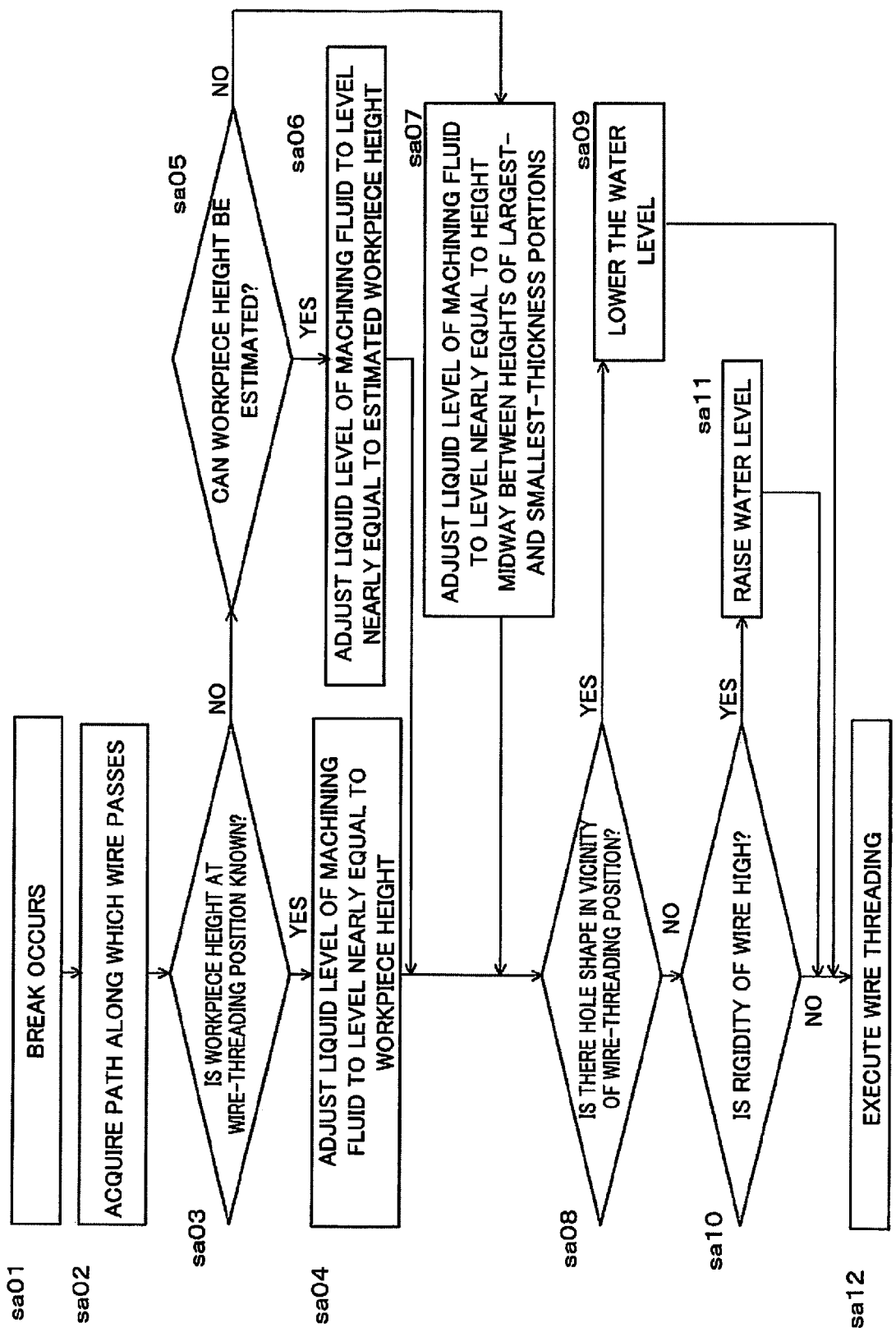
FIG. 3 is a flowchart for explaining processing according to the present invention.

FIG. 3 is a flowchart for explaining processing in the present embodiment. The flowchart of FIG. 3 will be described step by step below. It should be noted that this processing can be executed by a control device 50 shown in FIG. 4.

[Step sa01] A break in the wire electrode is detected.
[Step sa02] Information on the path along which the wire electrode passes is acquired.
[Step sa03] A determination is made as to whether the workpiece height at the wire-threading position of the wire electrode is known or not. If the height is known (YES), the flow goes to step sa04. If the height is unknown (NO), the flow goes to step sa05.
[Step sa04] The liquid level of the machining fluid is adjusted to a level nearly equal to the workpiece height, and the flow goes to step sa08.
[Step sa05] A determination is made as to whether the height of the workpiece can be estimated or not. If the height can be estimated (YES), the flow goes to step sa06. If the height cannot be estimated (NO), the flow goes to step sa07.
[Step sa06] The liquid level of the machining fluid is adjusted to a level nearly equal to the estimated workpiece height, and the flow goes to step sa08.
[Step sa07] The liquid level of the machining fluid is adjusted to a level nearly equal to a height midway between the heights of the largest-thickness portion and the smallest-thickness portion of the workpiece, and the flow goes to step sa08.
[Step sa08] A determination is made as to whether there is a hole shape (hole portion) in the vicinity of the wire-threading position or not. If there is a hole shape (YES), the flow goes to step sa09. If there is no hole shape (NO), the flow goes to step sa10.
[Step sa09] The water level of the machining fluid is lowered.
[Step sa10] A determination is made as to whether the rigidity of the wire electrode is high or not. If the rigidity is high (YES), the flow goes to step sa11. If the rigidity is not high (NO), the flow goes to step sa12.
[Step sa11] The water level of the machining fluid is raised.
[Step sa12] The threading of the wire electrode is executed.

Figure 4:
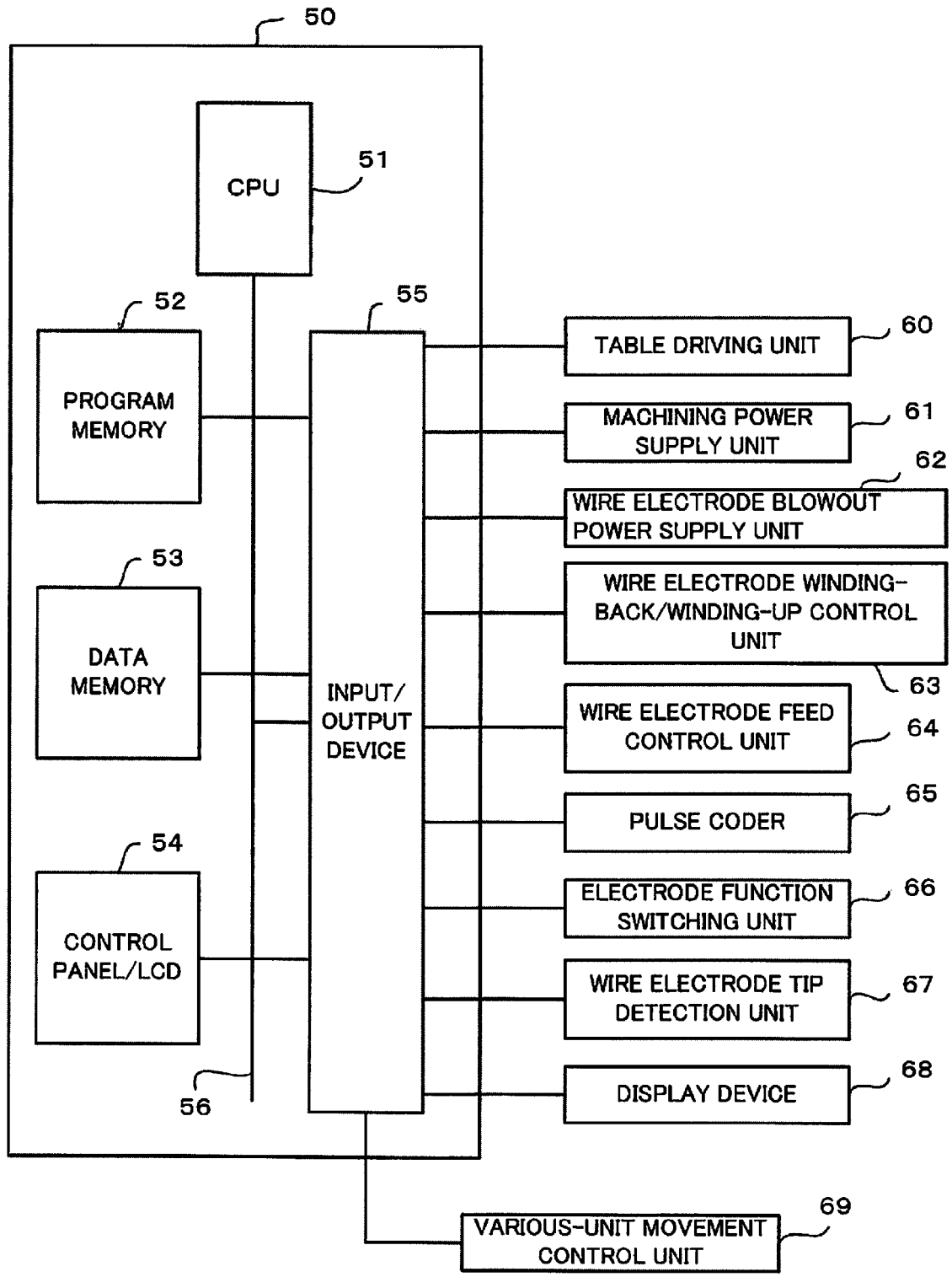
FIG. 4 is a diagram showing a wire-cut EDM machine including a control device.

FIG. 4 is a diagram showing a wire-cut EDM machine (see Japanese Patent Application Laid-Open No. 2011-136409) including a control device. The control device 50 includes a central processing unit (hereinafter referred to as a CPU) 51 including a microprocessor. A program memory 52, a data memory 53, a control panel 54 including a liquid crystal display LCD, and an input/output device 55 are connected to the CPU 51 through a bus 56.

The program memory 52 stores various programs for controlling various units of the wire-cut EDM machine and the control device 50 itself of the wire-cut EDM machine. The program memory 52 also stores a program for carrying out the present invention which is represented by the algorithm of the aforementioned flowchart. Moreover, the data memory 53 stores position data associated with the machining program and various kinds of setting data for specifying other machining conditions. The data memory 53 is also used as a memory for temporarily storing data for various kinds of calculation performed by the CPU 51.

A table driving unit 60, a machining power supply unit 61, a wire electrode blowout power supply unit 62, a wire electrode winding-back/winding-up control unit 63, a wire electrode feed control unit 64, a pulse coder 65, an electrode function switching unit 66, a wire electrode tip detection unit 67, a display device 68, and a various-unit movement control unit 69 for controlling other various units of the wire-cut EDM machine are connected to the input/output device 55.

The table driving unit 60 and the machining power supply unit 61 include publicly-known configurations, and are respectively controlled by general ways at the time of execution of machining. The wire electrode blowout power supply unit 62 is configured to supply power required to blow out the wire electrode 4. The wire electrode winding-back/winding-up control unit 63 is configured to drive a motor (not shown) for driving a wire electrode winding-up roller and a winding-back motor (not shown).

The wire electrode feed control unit 64 is a unit for controlling the driving of a brake motor for driving a brake roller. As described previously, the amount of rotation of the brake roller is detected by the pulse coder 65. The electrode function switching unit 66 is configured to select one of a wire electrode blowout electrode (wire electrode blowout unit) and wire electrode tip detection unit. A wire electrode tip detection signal from an electrode as the wire electrode tip detection unit is inputted to the wire electrode tip detection unit 67. Further, the various-unit movement control unit 69 is a representation of units for controlling the advancement and retraction of a second wire electrode blowout electrode, the lowering of a wire electrode feed pipe structure at the time of automatic wire threading, and the like.

The CPU 51 successively detects feedback pulses outputted from the pulse coder 65 when the wire electrode 4 normally runs (at the time of electrical discharge machining). When the feedback pulses are not detected for a certain period of time, the CPU 51 assumes that a break in the wire electrode 4 has occurred in an electrical discharge machining portion to stop the feed of the wire electrode 4 by the rotation of the wire electrode winding-up roller, i.e., to stop the rotation of the brake roller, and starts a wire recovery process.

The CPU 51 which has detected the occurrence of a break in the wire electrode 4 outputs a stop command to the table driving unit 60, the machining power supply unit 61, and the wire electrode winding-back/winding-up control unit 63 to stop the feed of each axis, the supply of machining power between upper and lower electrodes for machining and the workpiece, and the driving of the wire electrode winding-up roller, and then drives the wire electrode winding-up roller for a set predetermined period of time to wind up the broken wire electrode located below the electrical discharge machining portion.

Then, the CPU 51 resets the value of a counter which counts feedback pulses from the pulse coder 65, switches the electrode function to the wire electrode tip detection unit, outputs a drive command to the wire electrode winding-back/winding-up control unit 63 to start the forward rotation of a supply reel, i.e., an operation for winding off the wire electrode 4, and causes the supply reel to rotate forward until a tip detection signal is inputted from the wire electrode tip detection unit 67, i.e., until the upstream-side tip of the wire electrode 4 is wound off to the position of the second wire electrode blowout electrode as the wire electrode tip detection unit.

After that, based on the amount of winding off of the wire electrode 4 indicated by the value of the counter and various kinds of setting data, a portion wore by discharge is removed. Specifically, the CPU 51 outputs a drive command to the various-unit movement control unit 69 to actuate an air cylinder so that a gripping unit positioned at a standby position in an open state may be moved to an operating position, feeds the wire electrode 4 toward a machining region by a predetermined amount by driving the brake motor and controlling the position of the brake roller based on a feedback signal from the pulse coder 65, and causes the gripping unit to be closed and grip the wire electrode 4.

Subsequently, the CPU 51 switches the function of the second wire electrode blowout electrode to the wire electrode blowout unit, and actuates the wire electrode blowout power supply unit 62 to remove a portion of the wire electrode wore by electrical discharge machining.

In an automatic wire-threading process, the wire electrode 4 is held by a flow of the machining fluid emitted from an upper nozzle 6a of the upper wire guide 5a to be guided through the machined groove 2 of the workpiece Wa or Wb and passed through the lower wire guide 5b from the a lower nozzle 6b; or, the machining fluid is drawn into the lower nozzle 6b, and the wire electrode 4 is held by the flow of the machining fluid to be guided to the lower wire guide 5b.

Figure 5:
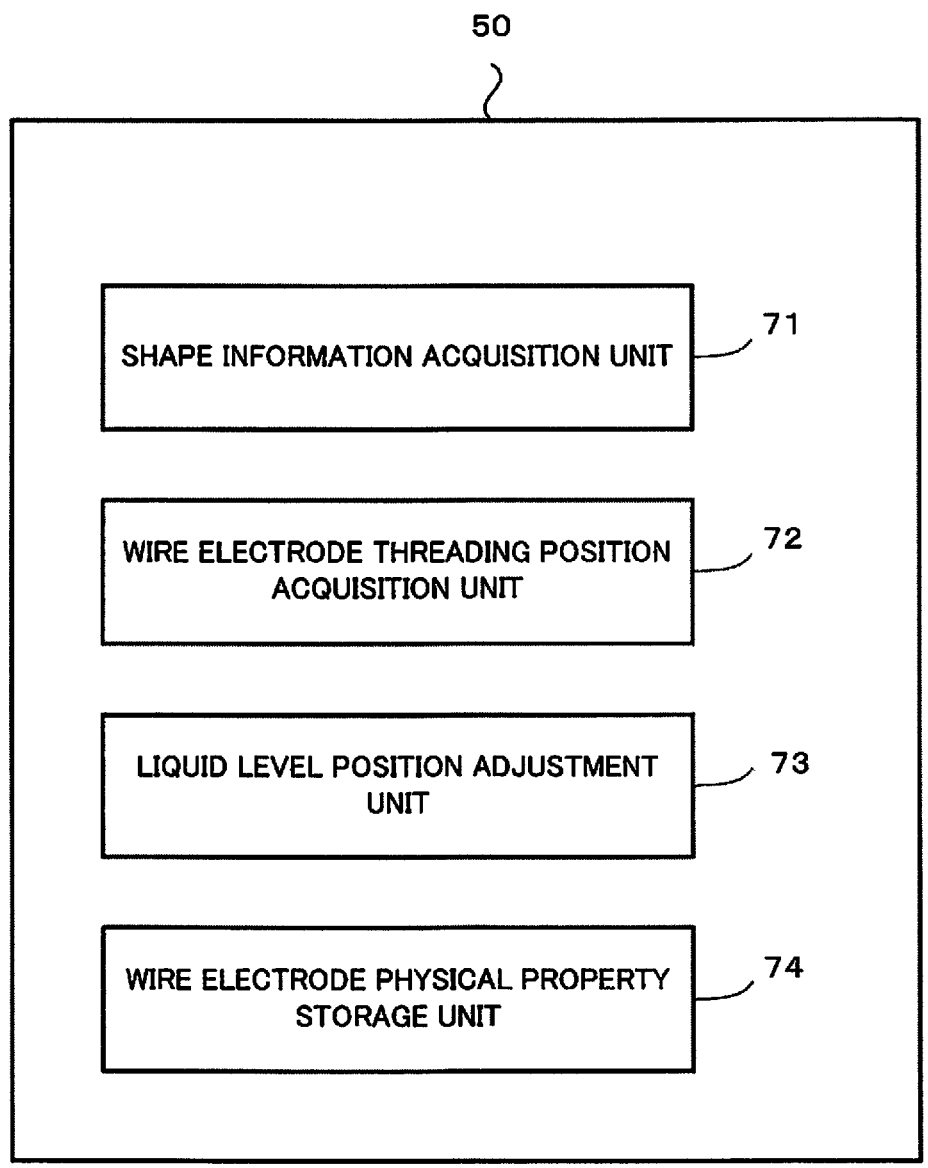
FIG. 5 is a diagram for explaining functions of a control device of a wire-cut EDM machine according to one embodiment of the present invention.

FIG. 5 is a diagram for explaining functions of a control device of a wire-cut EDM machine in one embodiment of the present invention. The control device 50 includes shape information acquisition unit 71 for acquiring information on the shape of an object to be machined, wire-threading position information acquisition unit 72 for acquiring information on the wire-threading position of the wire electrode 4 based on relative positions of the upper and lower wire guides 5a and 5b, and liquid level position adjustment unit 73 for acquiring information on the height of the workpiece in the vicinity of the wire-threading position based on the workpiece shape information and adjusting the position of the liquid level of the machining fluid at the time of automatic wire threading.

The shape information acquisition unit 71 can obtain the workpiece shape information by inputting data which associates machining positions with plate thicknesses of the workpiece (object to be machined).

The liquid level position adjustment unit 73 adjust the position of the liquid level of the machining fluid based on the shape of the upper surface of the workpiece as well as the height of the workpiece in the vicinity of the wire-threading position at the time of automatic wire threading. Alternatively, the liquid level position adjustment unit 73 adjusts the position of the liquid level of the machining fluid in accordance with physical properties of the wire electrode 4 as well as the height of the workpiece in the vicinity of the wire-threading position at the time of automatic wire threading.

The invention claimed is:

1. A wire-cut electrical discharge machine (EDM), comprising:
   a work tank for storing a machining fluid;
   a table provided in the work tank;
   upper and lower wire guides;
   a wire electrode stretched between the upper and lower wire guides;
   upper and lower nozzles at the upper and lower wire guides, respectively; and
   a control device having a processor programmed to
      control machining of an object to be machined mounted on the table by moving the wire electrode and the table relative to each other, and
      in response to a break of the wire electrode during said machining, control an automatic wire threading for automatically threading the wire electrode between the upper and lower wire guides,
   wherein the processor is programmed to, in said automatic wire threading,
      acquire a shape of the object to be machined,
      acquire a wire-threading position where the break of the wire electrode occurs, based on positions of the upper and lower wire guides,
      acquire a height of the object to be machined in a vicinity of the wire-threading position based on the acquired shape of the object to be machined,
      control adjustment of a liquid level of the machining fluid in the work tank at the time of automatic wire threading based on the acquired height of the object to be machined in the vicinity of the wire-threading position, and control rotation of a supply reel for winding off the wire electrode, wherein the wire electrode is held by
- a flow of the machining fluid emitted from the upper nozzle of the upper wire guide to be guided to the lower wire guide, or
- a flow of the machining fluid drawn into the lower nozzle to be guided to the lower wire guide.

2. The wire-cut EDM machine according to claim 1, wherein the processor is programed to acquire the shape of the object to be machined by receiving input data which associates machining positions with plate thicknesses of the object to be machined.

3. The wire-cut EDM machine according to claim 1, wherein the processor is programed to control the adjustment of the liquid level of the machining fluid at the time of automatic wire threading based on a shape of an upper surface of the object to be machined as well as the height of the object to be machined in the vicinity of the wire-threading position.

4. The wire-cut EDM machine according to claim 1, wherein the processor is programed to control the adjustment of the liquid level of the machining fluid at the time of automatic wire threading in accordance with physical properties of the wire electrode as well as the height of the object to be machined in the vicinity of the wire-threading position.

* * * * *